May 22, 1956     C. S. WEYANDT     2,746,599
ELASTOMER SUPPORTED BOWL FEEDERS
Filed Jan. 6, 1953
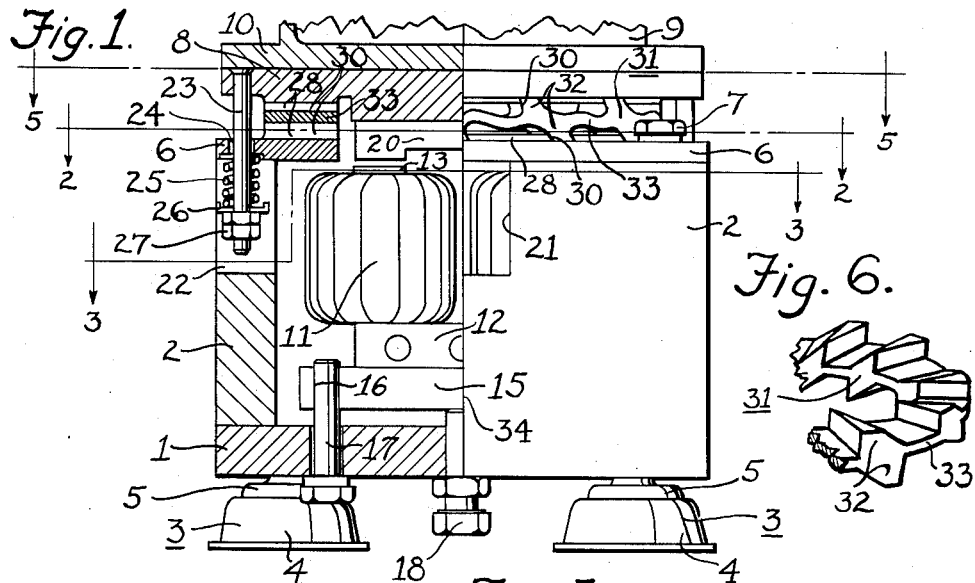
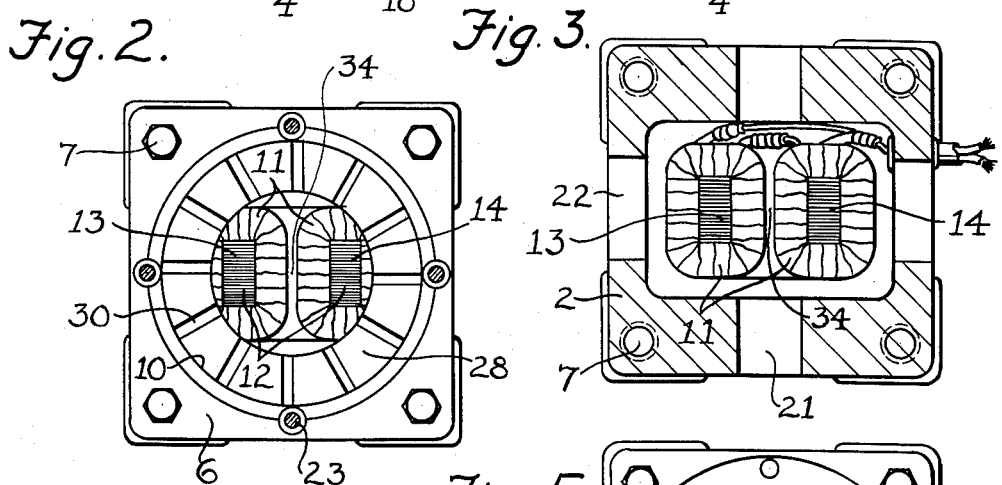
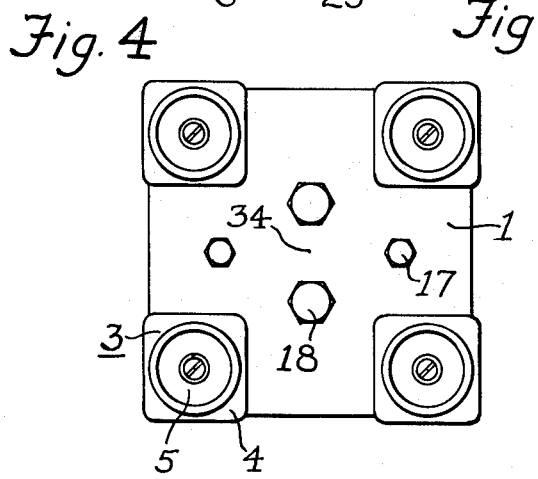
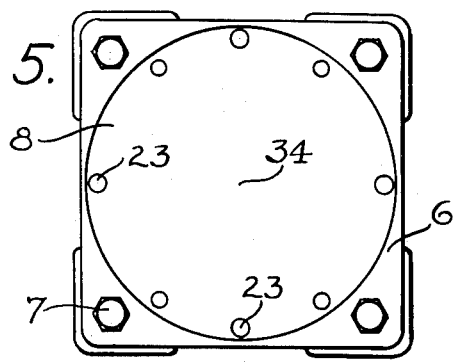
INVENTOR.
CARL S. WEYANDT
BY William D. Carothers
his Attorney United States Patent Office 2,746,599
Patented May 22, 1956

2,746,599

ELASTOMER SUPPORTED BOWL FEEDERS

Carl S. Weyandt, Indiana, Pa.

Application January 6, 1953, Serial No. 329,889

4 Claims. (Cl. 198—220)

This invention relates generally to bowl feeders and more particularly to a flexible elastomer for supporting a feeder bowl for vibration to convey material.

The flexible support for feeder bowls comprising this invention is an elastomer ring made into an annular series of levers integrally connected to each other by a ring or web. The levers around the ring are inclined, all sloping in the same direction. The upper and lower surfaces of the levers are preferably secured to a mounting plate. The top plate is fastened to the underside of a bowl and the bottom plate is fastened to the base. The vibratory motor may be mechanical or electromagnetic. The mechanical vibratory system ordinarily provides a slower rate and a greater aptitude of vibration than the electromagnetic.

The elastomer vibratory support has several advantages over the leaf spring and other forms of vibratory supports in that it may be made in one solid ring if it is relatively small. If it is for very large bowls, packers or feeders, it can be made in sections of quarters or sixths. Again, the elastomer vibratory support can be readily changed to vary the vibrating characteristics by changing the size and shape of the levers and also by changing the thickness and shape of the web that connects the levers. The web flexes during vibration and the levers merely change their degree of slope. The levers may flex or deform slightly but the principal flexing takes place in the web.

The flexible elastomer support may be pre-loaded by clamping the vibratory frame or member to the base. This partially flexes the web and deflects the levers placing them under load and pre-setting the tuning of the natural frequency. The tuning of the system may be readily adjusted by changing the pre-loading. The elastomer must be chosen at the outset to support the intended load and have a natural period of vibration at a predetermined frequency. The pre-loading may then be employed to tune the vibratory system to the exact frequency, which is a few cycles more or less than the driving impulses, whether they are mechanical or electrical. When a natural period is a few cycles off the driving impulses, it will follow in synchronism the driving impulses without erratic pulsations causing hunting fluctuations.

The principal object of this invention is the provision of a simple and economical flexible vibratory support that may be readily tuned to a predetermined natural frequency.

The elastomer vibratory support comprising this invention may be constructed from a series of sloping elastomer levers not integrally connected by the ring or web. In such a structure the sloping levers would be uniformly spaced around a central axis with their upper and lower ends vulcanized to mount rings. The angle of inclination of these levers is the same as that of the levers connected by the annular web. When the levers are unconnected by a web they may be easily made in sections, each including a plurality of levers vulcanized to upper and lower ring sections of quarters or sixths that are in turn attached to the member to be vibrated and the base respectively. These vibratory elastomer springs are then preloaded for tuning.

These sloping elastomer levers may be readily changed in size to change the vibrating characteristics. Under such circumstances the levers themselves are required to assume all the deformation, since the web is entirely omitted. However, if it was desired to make the resilient supporting element in a unit it is believed best to construct it as an elastomer ring with an annular web.

Other objects and advantages appear hereinafter in the following description and claims.

The accompanying drawings show, for the purpose of exemplification without limiting the invention or claims thereto, certain practical embodiments of the invention wherein:

Fig. 1 is a side elevation partly in section illustrating the present invention.

Fig. 2 is a horizontal sectional view taken on the line 2—2 of Fig. 1.

Fig. 3 is a horizontal sectional view taken on the line 3—3 of Fig. 1.

Fig. 4 is a view of the underside of the structure shown in Fig. 1.

Fig. 5 is a view of the structure taken on the line 5—5 of Fig. 1.

Fig. 6 is a partial perspective view of the flexible support.

Referring to the drawings, the elastomer supported feeder motor is mounted on the base 1, which has secured thereto the rectangular wall 2 and which is supported on the feet 3, of which there are four in number. These feet are constructed with the cup member 4 having opposition therein to the rubber member 5 which is secured by means of a screw to the underside of the base member 1. The top of the rectangular casing 2 is enclosed by the plate member 6 which has a circular opening and which is secured to the wall 2 by means of the bolts 7, of which there are four in number as shown in Figs. 2 and 5.

The vibrating element or platform 8 is circular, as illustrated in Fig. 5, and is provided with a smooth top surface for receiving the member to be vibrated, such as indicated by the feeder bowl 9 supported on its base 10, the base 10 being secured or otherwise fastened to the vibratory member 8.

The electromagnetic motor is made up of the coils 11 which are placed on the core member 12 that provides spaced pole faces 13 and 14. The core member 12 is U shaped in construction and its lower end is secured to the mounting bracket 15 that is provided with two threaded openings 16 for receiving the bolts 17 that pass up through a clearance hole in the base member 1. Another pair of bolts 18 are threadably secured in the base member 1 and engage the underside of the bracket 15. Thus with the bolts 17 and 18 one can adjust the proper angular position of the electromagnetic motor member so as to present the pole faces 13 and 14 in proper spaced relation in regard to the pole faces at the opposite ends of the armature 20 which is mounted on the underside of the member to be vibrated, the plate or frame member 8.

As shown in Fig. 3, the wall 2 of the base member is provided with the oppositely disposed windows 21 and 22. Each of these windows is provided to receive the lower end of the bolt 23, which have flat heads to be received in the countersunk holes on the top surface of the plate 8 and which extend down to openings 24 in the top plate 6 of the housing and receive the coil spring 25, which is held in place by the coil spring washer 26 and the nut and lock assembly as illustrated at 27. Thus four of the bolts 23 are disposed at an opposite 90° relation to one another and are each provided with springs so as to draw the plate 8 towards the base member 1.

The underside of the plate member 8 and the top surface of the plate 6 have an annular land section which is provided with a series of lands 28. Each of the annular lands has a series of radially disposed slots 30 for receiving the ends of the upper and lower ends of the elastomer 31. The elastomer member 31 has a series of upwardly and downwardly disposed sections 32 that are connected by the web 33. Each of these projections 32 are opposite one another and one face of each projection is vertical while the other face slopes relative to the vertical face, as illustrated in Fig. 6 of the drawings. The vertical faces and the sloping faces of the upper and lower projections are parallel to one another. When the elastomer vibratory supporting member 31 is placed so that its lower projections and upward projections fit in the corresponding slots 30 and the bolts 23 with their springs 25 hold the plate down the elastomer member 31 is placed under compression and the projections or levers are deformed and partially flexed, as illustrated in Fig. 1. When the motor member is excited by a pulsating current, such as an alternating current supplied through a single wave rectifier, the plate member 8 is vibrated in an inclined arcuate motion about the central axis 34 of the electromagnetic motor and is required to vibrate. By employing the annular elastomer member 31 one may be enabled to properly tune the same by pre-loading it and taking up the nuts 27 so as to create a compression force by the springs 25 on the elastomer member 31. Thus by pre-loading the device, one can readily tune the same to vibrate at a proper frequency.

If it is desired the armature 20 may be made a permanent magnet and under such circumstances it is unnecessary to employ a half wave rectifier.

The web 33 connecting the projections that form lever members is required to flex when the motor is excited, as illustrated in Fig. 1. The projections 32 merely function as a lever and are displaced to a greater degree, causing the web member to flex to a greater degree than that shown.

I claim:

1. A vibratory material handling device comprising a base having an annular top surface, an element to be vibrated having an annular bottom surface opposed to the top surface of said base, an annular series of spaced flexible elastomer levers connected to each other intermediate their ends and sloping in the same direction and secured to said top and bottom annular surfaces to support said element for reciprocation in a confined inclined arcuate path of movement about a vertical central axis and at a predetermined natural period of reciprocation, and driving means mounted in said base for imparting energy impulses to reciprocate said element in synchronism with the frequency of said energy impulses, said inclined flexible elastomer levers supporting and guiding said element to reciprocate as a free body in an inclined arcuate path of movement.

2. The structure of claim 1 which also includes means resiliently clamping said element to said base to pre-load said elastomer levers to tune the natural period of the vibratory system.

3. The structure of claim 1 characterized in that said driving means is electromagnetic and the impulses are directed substantially vertically.

4. The structure of claim 1 which also includes an annular series of pockets in said opposed top and bottom surfaces to receive the ends of said flexible elastomer levers.

References Cited in the file of this patent

UNITED STATES PATENTS

| | | |
|---|---|---|
| 973,921 | Dodge | Oct. 25, 1910 |
| 1,951,013 | Flinterman | Mar. 13, 1934 |
| 2,071,373 | Wurzbach et al. | Feb. 23, 1937 |
| 2,464,216 | Devol | Mar. 15, 1949 |